US012679954B2

(12) United States Patent
Shin et al.

(10) Patent No.: US 12,679,954 B2

(45) Date of Patent: Jul. 14, 2026

(54) LIGHT-TRANSMISSIVE FILM, MANUFACTURING METHOD THEREFOR, AND DISPLAY DEVICE COMPRISING SAME

(71) Applicant: KOLON INDUSTRIES, INC., Seoul (KR)

(72) Inventors: Hyo Ra Shin, Seoul (KR); Hyo Jun Park, Seoul (KR); Hak-Gee Jung, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 719 days.

(21) Appl. No.: 18/001,607

(22) PCT Filed: Jul. 7, 2021

(86) PCT No.: PCT/KR2021/008640

§ 371 (c)(1),
(2) Date: Dec. 13, 2022

(87) PCT Pub. No.: WO2022/010253

PCT Pub. Date: Jan. 13, 2022

(65) Prior Publication Data

US 2023/0312881 A1 Oct. 5, 2023

(30) Foreign Application Priority Data

Jul. 10, 2020 (KR) ........................ 10-2020-0085706
Jul. 10, 2020 (KR) ........................ 10-2020-0085707

(Continued)

(51) Int. Cl.

*C08K 9/04* (2006.01)
*C08J 5/18* (2006.01)

(Continued)

(52) U.S. Cl.

CPC .................................... *C08K 9/04* (2013.01); *C08J 5/18* (2013.01); *C08K 3/36* (2013.01); *C08K 5/06* (2013.01);

(Continued)

(58) Field of Classification Search

None

See application file for complete search history.

(56) References Cited

U.S. PATENT DOCUMENTS

2017/0326851 A1* 11/2017 Mochizuki ............... C08K 3/36
2018/0194128 A1* 7/2018 Akhter ..................... B41M 5/52

(Continued)

FOREIGN PATENT DOCUMENTS

JP 2003171577 A 6/2003
JP 2019194668 A 11/2019

(Continued)

OTHER PUBLICATIONS

Neopulim (Transparent polyimide varnish), Mitsubishi Gas Chemical, 2025. (Year: 2025).*

*Primary Examiner* — Peter A Salamon

(74) *Attorney, Agent, or Firm* — Harvest IP Law, LLP

(57) ABSTRACT

One embodiment of the present invention provides a method for manufacturing a light-transmissive film, a light-transmissive film manufactured by the manufacturing method, and a display device comprising the light-transmissive film, the method comprising the steps of: preparing a light-transmissive resin powder; preparing a light-transmissive resin solution by dissolving a first amount of the light-transmissive resin powder in a first solvent; preparing a filler dispersion solution by dispersing a filler in a second solvent; preparing a first mixture solution by mixing the filler dispersion solution and the light-transmissive resin solution; and preparing a second mixture solution by adding a second (Continued)

amount of the light-transmissive resin powder to the first mixture solution and dissolving same.

10 Claims, 3 Drawing Sheets

(30) Foreign Application Priority Data

Jul. 7, 2021 (KR) ........................ 10-2021-0088851
Jul. 7, 2021 (KR) ........................ 10-2021-0088852

(51) Int. Cl.
*C08K 3/36* (2006.01)
*C08K 5/06* (2006.01)

(52) U.S. Cl.
CPC ..... *C08J 2379/08* (2013.01); *C08K 2201/011* (2013.01)

(56) References Cited

U.S. PATENT DOCUMENTS

2019/0233590 A1* 8/2019 Jeong ...................... B29C 39/14
2020/0108588 A1* 4/2020 Jeon ......................... G02B 1/14

FOREIGN PATENT DOCUMENTS

| | | | |
|---|---|---|---|
| KR | 20140136235 | A | 11/2014 |
| KR | 20170126800 | A | 11/2017 |
| KR | 20180081163 | A | 7/2018 |
| KR | 20190092696 | A | 8/2019 |
| KR | 20200040137 | A | 4/2020 |

* cited by examiner

LIGHT-TRANSMISSIVE FILM, MANUFACTURING METHOD THEREFOR, AND DISPLAY DEVICE COMPRISING SAME

CROSS REFERENCE TO RELATED APPLICATION(S)

This application is a National Stage of International Application No. PCT/KR2021/008640 filed Jul. 7, 2021, claiming priority based on Korean Patent Application No. 10-2020-0085706 filed Jul. 10, 2020, Korean Patent Application No. 10-2020-0085707 filed Jul. 10, 2020, Koran Patent Application No. 10-2021-0088851 filed Jul. 7, 2021 and Korean Patent Application No. 10-2021-0088852 filed Jul. 7, 2021, the disclosures of which are incorporated herein by reference in their entireties.

TECHNICAL FIELD

The present disclosure relates to a light-transmitting film having excellent filler dispersibility, a method of manufacturing the same, and a display device including same.

BACKGROUND ART

Recently, the use of a light-transmitting film instead of glass as a cover window of a display device has been considered with the goal of reducing the thickness and weight and increasing the flexibility of the display device. In order for the light-transmitting film to be usable as a cover window of a display device, the light-transmitting film needs to have excellent physical properties such as hardness, abrasion resistance, and flexibility.

Transparent plastic films are being studied as light-transmitting films for cover windows of display devices. Among transparent plastic films, for example, a polyimide-based film having high hardness is being researched as a material for cover windows of flexible display devices. The polyimide-based film is made of a polyimide (PI)-based resin. Polyimide (PI)-based resins have insolubility, chemical resistance, heat resistance, radiation resistance and low-temperature characteristics, and are thus used as automobile materials, aviation materials, spacecraft materials, insulating coatings, insulating films, protective films and the like.

Meanwhile, in order to impart desired physical properties to the light-transmitting film, a filler may be added to the light-transmitting film. The filler is preferably uniformly dispersed in the light-transmitting film.

DISCLOSURE

Technical Problem

Therefore, the present disclosure has been made in view of the above problems, and it is one object of the present disclosure to provide a method for producing a light-transmitting film having excellent filler dispersibility.

It is another object of the present disclosure to provide light-transmitting film including a filler uniformly dispersed in a light-transmitting matrix.

It is another object of the present disclosure to provide a light-transmitting film having a power law slope obtained through U-SAXS analysis of −3.6 to −3.2.

It is another object of the present disclosure to provide a light-transmitting film that is imparted with excellent light transmittance and low haze by uniformly dispersing the filler therein.

It is another object of the present disclosure to provide a light-transmitting film that is imparted with a high Young's modulus by uniformly dispersing the filler in the light-transmitting matrix.

It is another object of the present disclosure to provide a polyimide-based film that includes a filler dispersed in a polyimide-based matrix so as to have an average particle-scattering coefficient of 0.35 or less and thus exhibits excellent optical and mechanical properties.

It is another object of the present disclosure to provide a display device including the polyimide-based film having excellent filler dispersibility.

Technical Solution

In accordance with the present disclosure, the above and other objects can be accomplished by the provision of a method of producing a light-transmitting film including preparing a light-transmitting resin powder, dissolving a first amount of the light-transmitting resin powder in a first solvent to prepare a light-transmitting resin solution, dispersing a filler in a second solvent to prepare a filler dispersion, mixing the filler dispersion with the light-transmitting resin solution to prepare a first mixed solution, and adding a second amount of the light-transmitting resin powder to the first mixed solution, followed by dissolution, to prepare a second mixed solution.

The first amount of the light-transmitting resin powder may be 0.5 to 10% based on the weight of the filler.

The method may further include adding a third solvent to the first mixed solution before adding the second amount of the light-transmitting resin powder to the first mixed solution.

The third solvent may be the same as the first solvent.

The second amount of the light-transmitting resin powder may be 10 to 200 times the first amount.

The light-transmitting resin may include an imide repeating unit.

The light-transmitting resin may include an amide repeating unit.

In accordance with another aspect of the present disclosure, provided is a light-transmitting film including a light-transmitting matrix and a filler dispersed in the light-transmitting matrix, wherein, in an ultra-small-angle X-ray scattering (U-SAXS) graph logarithmically showing a scattering intensity as a function of a wavenumber, the light-transmitting film has a power law slope, which is the slope of the graph in a wavenumber range of 0.01/Å to 0.1/Å, of −3.6 to −3.2.

The filler includes silica ($SiO_2$).

At least a part of the silica ($SiO_2$) may be surface-treated with an organic compound having an alkoxy group.

The filler may have an average particle diameter of 5 to 50 nm.

The filler may be present in an amount of 5 to 46% by weight based on the total weight of the light-transmitting film.

The average shortest distance between adjacent filler particles may be between 23 and 45 nm.

The light-transmitting film may have a yellow index of 3 or less.

The light-transmitting film may have a haze of 1% or less.

The light-transmitting film may have a light transmittance of 85% or more.

The light-transmitting film may have a Young's modulus of 4.5 GPa or more and a 2% yield strength of 95 MPa or more.

The light-transmitting matrix may include an imide repeating unit.

The light-transmitting matrix may include an amide repeating unit.

In accordance with another aspect of the present disclosure, provided is a light-transmitting film including a light-transmitting matrix and a filler dispersed in the light-transmitting matrix, wherein the filler has an average particle-scattering coefficient (XA) of 0.35 or less, wherein the average particle-scattering coefficient (XA) is calculated in accordance with the following Equation 1:

$$XA = \sum_{k=1}^{38} X_k / 38 \qquad \text{[Equation 1]}$$

wherein $X_k$ is calculated in accordance with the following Equation 2:

$$X_k = \prod D / \lambda_k \qquad \text{[Equation 2]}$$

wherein k is an integer from 1 to 38, $\lambda_k$ is (37+k)×10 nm and D is a particle size of the filler, measured using transmission electron microscopy (TEM).

The filler may be present in an amount of 5 to 50% by weight based on the total weight of the light-transmitting film.

The light-transmitting film may have a light transmittance of 88% or more.

The light-transmitting film may have a modulus of 5.0 GPa or more.

In accordance with another aspect of the present disclosure, there is provided a display device including a display panel and the light-transmitting film disposed on the display panel.

Advantageous Effects

According to an embodiment of the present disclosure, a light-transmitting film having excellent filler dispersibility can be produced.

In general, when a filler is dispersed in a light-transmitting film, the haze of the light-transmitting film may be deteriorated. On the other hand, according to one embodiment of the present disclosure, the light-transmitting film exhibits superior haze characteristics due to excellent filler dispersibility and has a power law slope, measured through U-SAXS analysis, of −3.6 to −3.2. In addition, the light-transmitting film according to an embodiment of the present disclosure has an excellent Young's modulus and excellent yield strength.

The light-transmitting film according to an embodiment of the present disclosure has excellent optical and mechanical properties, and thus can effectively protect a display surface of a display device when used as a cover window of the display device.

DESCRIPTION OF DRAWINGS

The above and other objects, features and other advantages of the present disclosure will be more clearly understood from the following detailed description taken in conjunction with the accompanying drawings, in which.

BEST MODE

Figure 1:
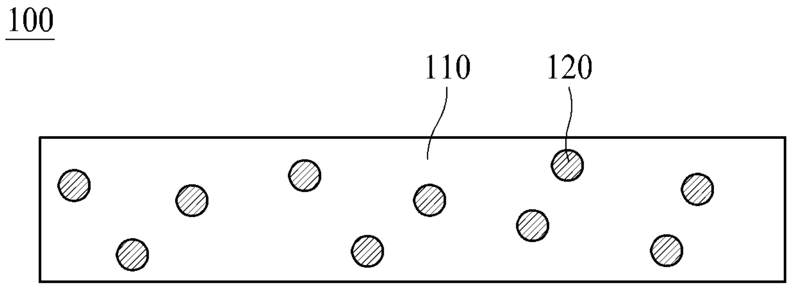
FIG. 1 is a schematic view illustrating a light-transmitting film according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when a detailed description of relevant known functions or configurations is determined to unnecessarily obscure important points of the present disclosure, the detailed description will be omitted.

In the case in which the term such as "comprise", "have", or "include" is used in the present specification, another part may also be present, unless "only" is used. Terms in a singular form may include the plural meanings unless noted to the contrary. Also, in construing an element, the element is to be construed as including an error range even if there is no explicit description thereof.

In describing a positional relationship, for example, when the positional relationship is described as "on", "above", "below", or "next", the case of no contact therebetween may be included, unless "just" or "directly" is used.

Spatially relative terms such as "below", "beneath", "lower", "above", and "upper" may be used herein to describe the relationship of a device or an element to another device or another element as shown in the figures. It will be understood that spatially relative terms are intended to encompass different orientations of a device during the use or operation of the device, in addition to the orientation depicted in the figures. For example, if a device in one of the figures is turned upside down, elements described as "below" or "beneath" other elements would then be positioned "above" the other elements. The exemplary term "below" or "beneath" can, therefore, encompass the meanings of both "below" and "above". In the same manner, the exemplary term "above" or "upper" can encompass the meanings of both "above" and "below".

In describing temporal relationships, for example, when the temporal order is described using "after", "subsequent", "next", or "before", the case of a non-continuous relationship may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

It should be understood that the term "at least one" includes all combinations related with any one item. For example, "at least one among a first element, a second element, and a third element" may include all combinations of two or more elements selected from among the first, second, and third elements, as well as each of the first, second, and third elements.

Features of various embodiments of the present disclosure may be partially or completely coupled to or combined with each other, and may be variously interoperated with each other and driven technically, as will be easily understood by those skilled in the art. The embodiments of the present disclosure may be carried out independently from each other, or may be carried out together in an interrelated manner.

FIG. 1 is a schematic diagram illustrating a light-transmitting film 100 according to an embodiment of the present disclosure.

The light-transmitting film 100 according to an embodiment of the present disclosure includes a light-transmitting matrix 110 and a filler 120 dispersed in the light-transmitting matrix.

According to an embodiment of the present disclosure, the light-transmitting matrix 110 is light-transmissive. In addition, the light-transmitting matrix 110 may be flexible. For example, the light-transmitting matrix 110 may be bendable, foldable and rollable.

The light-transmitting matrix 110 includes a light-transmitting resin. The light-transmitting matrix 110 may include, for example, an imide repeating unit. In addition, the light-transmitting matrix 110 may include, for example, an amide repeating unit.

The light-transmitting matrix 110 according to an embodiment of the present disclosure may be prepared from monomer components including, for example, dianhydride and diamine. More specifically, the light-transmitting matrix 110 according to an embodiment of the present disclosure may have an imide repeating unit formed from dianhydride and diamine.

In addition, the light-transmitting matrix 110 according to an embodiment of the present disclosure may have an amide repeating unit formed from a dicarbonyl compound and diamine.

The light-transmitting matrix 110 according to an embodiment of the present disclosure may be prepared from monomer components including dianhydride, diamine, and the dicarbonyl compound. Accordingly, the light-transmitting matrix 110 according to an embodiment of the present disclosure may have an imide repeating unit and an amide repeating unit. The light-transmitting matrix 110 having an imide repeating unit and an amide repeating unit may be, for example, a polyamide-imide resin.

Accordingly, the light-transmitting matrix 110 according to an embodiment of the present disclosure may include a polyimide resin or a polyamide-imide resin. According to an embodiment of the present disclosure, a resin including an imide repeating unit is referred to as a polyimide-based resin. The polyimide-based resin includes a polyimide resin and a polyamide-imide resin.

According to an embodiment of the present disclosure, the light-transmitting resin used as the light-transmitting matrix 110 may have excellent mechanical and optical properties.

The light-transmitting matrix 110 may have a thickness sufficient to enable the light-transmitting film 100 to protect the display panel. For example, the light-transmitting matrix 110 may have a thickness of 10 to 100 μm. According to an embodiment of the present disclosure, the thickness of the light-transmitting matrix 110 may correspond to the thickness of the light-transmitting film 100. According to one embodiment of the present disclosure, the light-transmitting film 100 may have a thickness of 10 to 100 μm.

The light-transmitting matrix 110 may have an average light transmittance of 85% or more and a yellow index of 5 or less in a visible light region, measured using a UV spectrophotometer based on a thickness of 10 to 100 μm.

The light-transmitting film 100 according to an embodiment of the present disclosure includes, for example, a polyimide-based film using a polyimide-based resin as the light-transmitting matrix 110. The polyimide-based film includes a polyimide film and a polyamide-imide film.

The filler 120 may be an inorganic material or an organic material. The filler 120 may have a particle shape. The filler 120 may include at least one of inorganic particles, organic particles, or organic-inorganic hybrid particles. According to an embodiment of the present disclosure, for example, an inorganic filler may be used.

According to an embodiment of the present disclosure, the filler 120 may include silica ($SiO_2$). For example, inorganic silica ($SiO_2$) particles may be used as the filler 120.

According to an embodiment of the present disclosure, at least a part of silica ($SiO_2$) used as the filler 120 may be surface-treated. More specifically, the surface-treated silica ($SiO_2$) particles may be used as the filler 120.

According to an embodiment of the present disclosure, at least a part of the silica ($SiO_2$) used as the filler 120 may be surface-treated with an organic compound having an alkoxy group. For example, silica ($SiO_2$) particles surface-treated with at least one of substituted or unsubstituted alkylalkoxysilane and phenylalkoxysilane may be used as the filler 120.

Specifically, silica ($SiO_2$) particles surface-treated with methylalkoxysilane, or ethylalkoxysilane, phenylalkoxysilane may be used as the filler 120. More specifically, silica ($SiO_2$) particles surface-treated with trimethoxy(methyl) silane and phenyltrimethoxysilane may be used as the filler 120.

According to an embodiment of the present disclosure, the filler 120 may have a unit structure represented by the following Formula 1 to Formula 6:

[Formula 1]

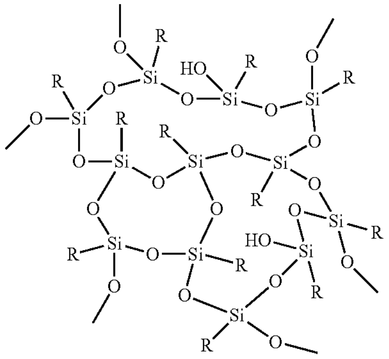

-continued

{Formula 2]

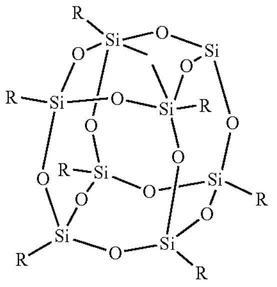

[Formula 3]

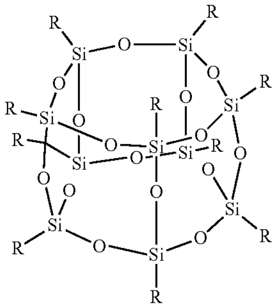

[Formula 4]

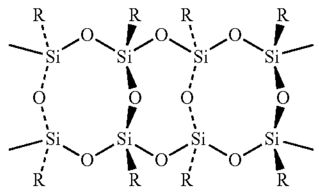

[Formula 5]

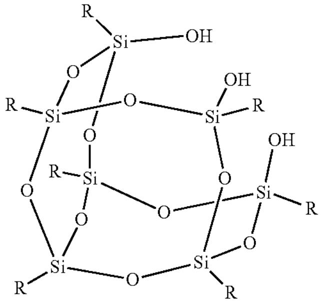

[Formula 6]

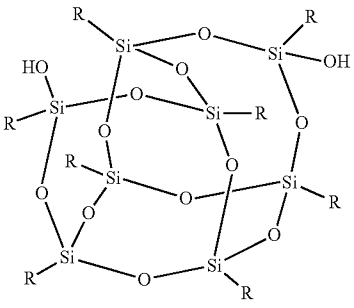

wherein R is each independently at least one of an alkyl group having 1 to 10 carbon atoms, an alkoxy group having 1 to 10 carbon atoms, a cycloalkyl group having 3 to 10 carbon atoms, or a phenyl group having 6 to 18 carbon atoms.

Hereinafter, a method of producing the light-transmitting film 100 according to an embodiment of the present disclosure will be described. For convenience of description, the method of producing the light-transmitting film 100 will be described with reference to an embodiment in which the light-transmitting film 100 is a polyimide-based film.

The light-transmitting film 100 according to an embodiment of the present disclosure may be produced by a hybrid mixing method using a combination of solution-solution mixing and solution-powder mixing.

According to an embodiment of the present disclosure, the method of producing the light-transmitting film 100 includes preparing a light-transmitting resin powder, dissolving a first amount of the light-transmitting resin powder in a first solvent to prepare a light-transmitting resin solution, dispersing a filler in a second solvent to prepare a filler dispersion, mixing the filler dispersion with the light-transmitting resin solution to prepare a first mixed solution, and adding a second amount of the light-transmitting resin powder to the first mixed solution, followed by dissolution, to prepare a second mixed solution.

The light-transmitting resin may include an imide repeating unit. In addition, the light-transmitting resin may include an amide repeating unit. According to an embodiment of the present disclosure, as the light-transmitting resin, for example, a polyimide-based resin may be used.

The dispersion of the filler 120 may be prepared by adding filler particles to a second solvent, followed by stirring.

The method of producing the light-transmitting film 100 according to an embodiment of the present disclosure may further include casting the second mixed solution.

A casting substrate is used for casting. There is no particular limitation as to the type of the casting substrate. The casting substrate may be a glass substrate, a stainless (SUS) substrate, a Teflon substrate, or the like. According to an embodiment of the present disclosure, the casting substrate may be, for example, a glass substrate.

According to an embodiment of the present disclosure, the light-transmitting resin powder is separated into at least two aliquots and mixed with the filler dispersion.

Specifically, the first amount of the light-transmitting resin powder is dissolved in the first solvent and is mixed in the form of a light-transmitting resin solution with the filler dispersion. The first amount of the light-transmitting resin powder may be 0.5 to 10% based on the weight of the filler. More specifically, the first amount of the light-transmitting resin powder may be within the range of 1 to 10% based on the total weight of the filler 120.

In addition, the second amount of the light-transmitting resin powder is added in a powder form. Specifically, the second amount of the light-transmitting resin powder may be added in a powder form to the first mixed solution, which is prepared by mixing the filler dispersion with the light-transmitting resin solution.

The second amount of the light-transmitting resin powder may correspond to an amount remaining after exclusion of the first amount from the total amount of the light-transmitting resin powder used to produce the light-transmitting film 100. For example, the second amount may be at least 5 times, 10 times, or 50 times the first amount. According to another embodiment of the present disclosure, the second amount of the light-transmitting resin powder may be at least 100 times the first amount.

According to an embodiment of the present disclosure, the second amount of the light-transmitting resin powder may be 10 to 200 times the first amount. More specifically, the second amount of the light-transmitting resin powder may be 60 to 200 times the first amount.

According to one embodiment of the present disclosure, before adding the second amount of the light-transmitting resin powder to the first mixed solution, the method may further include adding a third solvent to the first mixed solution. The third solvent may be the same as or different from the first solvent. According to an embodiment of the present disclosure, the third solvent may be the same as the first solvent may be used as the third solvent DMAC (N,N-dimethylacetamide) may be used as the first solvent. DMAC (N,N-dimethylacetamide) or methyl ethyl ketone (MEK) may be used as the second solvent. DMAC (N,N-dimethylacetamide) may be used as the third solvent. However, embodiments of the present disclosure are not limited thereto, and other known solvents may be used as the first solvent, the second solvent, and the third solvent.

According to an embodiment of the present disclosure, first, a part (the first amount) of the light-transmitting resin powder is dissolved in a solvent and is then mixed with the filler dispersion. As a result, the dispersibility of the filler is improved.

For reference, when the light-transmitting resin powder is directly injected into the filler dispersion in which the filler is dispersed, the solvent instantly penetrates the inside of the powder from the surface of the powder, at which time, the concentration around the surface of the powder increases instantly, whereby the filler may aggregate.

On the other hand, according to an embodiment of the present disclosure, by first adding a light-transmitting resin solution, prepared by dissolving the light-transmitting resin powder, to a filler dispersion containing a solvent, the polymer chains of the light-transmitting resin dispersed between the filler particles can prevent aggregation of the filler particles. Then, even if the second amount of the light-transmitting resin powder is also added, aggregation between filler particles does not occur. As a result, aggregation of the filler can be prevented, and the dispersibility of the filler can be improved.

According to an embodiment of the present disclosure, the light-transmitting film 100 including the filler 120 uniformly dispersed therein may be produced using a hybrid mixing method in which solution-solution mixing and solution-powder mixing are combined.

According to an embodiment of the present disclosure, the high degree of freedom of the filler 120 and the light-transmitting resin can be maintained, so an environment facilitating dispersion can be created. As a result, the filler 120 can be bonded to the light-transmitting resin in a high degree of freedom, and a light-transmitting film 100 in which the filler 120 is uniformly dispersed in the matrix 110 formed by the light-transmitting resin can be produced.

According to an embodiment of the present disclosure, silica particles may be used as the filler 120. The silica particles may be prepared, for example, from tetraethyltriethoxysilane. For example, silica particles ($SiO_2$) having an average particle diameter of about 20 nm may be prepared by injecting ethanol and tetraethyltriethoxysilane (TEOS, $Si(OC_2H_5)_4$) into a reactor, stirring the ingredients at room temperature, adding $NH_4OH$ thereto, stirring the ingredients, filtering the resulting reaction product, washing the filtrate with ethanol, and drying the residue under reduced pressure.

A silica dispersion may be used as the dispersion of the filler 120. The silica dispersion may be prepared, for example, by injecting dimethylacetamide (DMAc) and silica particles into a reactor, followed by stirring.

The light-transmitting film 100 according to an embodiment of the present disclosure having excellent filler dispersibility has excellent mechanical and optical properties.

The light-transmitting film 100 according to an embodiment of the present disclosure has a power law slope of −3.6 to −3.2.

Specifically, in an ultra-small-angle X-ray scattering (U-SAXS) graph logarithmically showing scattering intensity as a function of a wavenumber, the light-transmitting film 100 according to an embodiment of the present disclosure has a power law slope, which is the slope of the graph, of −3.6 to −3.2 in a wavenumber range of 0.01/Å to 0.1/Å.

An ultra-small angle X-ray scattering (U-SAXS) graph is obtained through measurement of ultra-small angle X-ray scattering.

The ultra-small-angle X-ray scattering (U-SAXS) graph shows the wavenumber dependence of a scattering intensity I in a scattering angle (2θ) range of 5° or less in scattered X-rays that are incident on the film and scattered by the particles included in the film. According to an embodiment of the present disclosure, the scattering angle 2θ may be adjusted by varying the spacing distance between the sample and the detector. According to an embodiment of the present disclosure, the ultra-small angle X-ray scattering graph shows scattering intensity I as a function of wavenumber Q (unit: $Å^{-1}$) instead of angle θ normally applied to X-ray diffraction analysis. The wavenumber Q is calculated from $2\pi/\lambda$, and λ represents the wavelength of X-rays.

Figure 2:
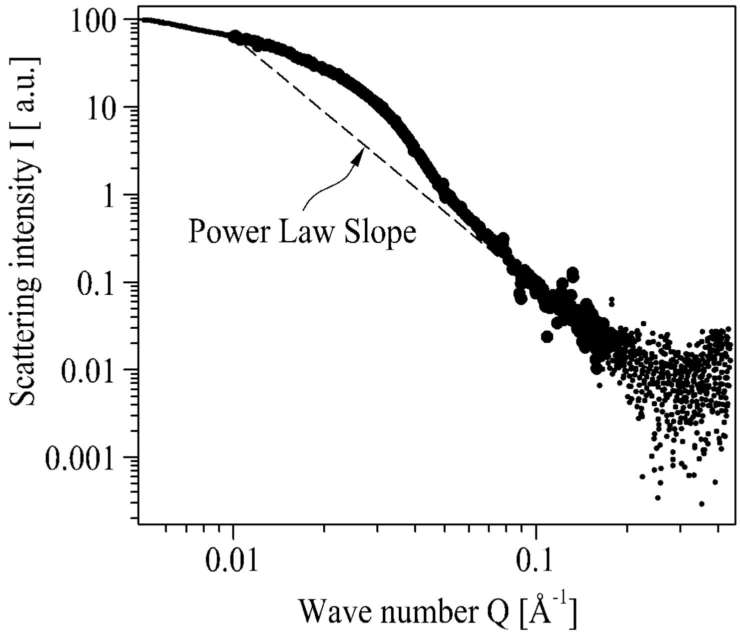
FIG. 2 is a U-SAXS graph of a light-transmitting film according to another embodiment of the present disclosure.

For example, as shown in FIG. 2, an ultra-small angle X-ray scattering graph may be obtained in a wavenumber range of 0.001 to 0.15/Å. In the ultra-small angle X-ray scattering graph according to an embodiment of the present disclosure, the scattering intensity I versus the wave number Q is represented logarithmically.

According to an embodiment of the present disclosure, a slope is measured at a wavenumber ranging from 0.01/Å to 0.1/Å in the ultra-small-angle X-ray scattering graph logarithmically representing scattering intensity I versus wavenumber Q, and the slope thus measured corresponds to the power law slope. In the light-transmitting film 100 according to an embodiment of the present disclosure, the power law slope is −3.6 to −3.2.

FIG. 2 is an ultra-small-angle X-ray scattering (U-SAXS) graph for the light-transmitting film 100 according to an embodiment of the present disclosure. Referring to FIG. 2, in the ultra-small-angle X-ray scattering (U-SAXS) graph, the scattering intensity I versus wavenumber Q is represented logarithmically. Referring to FIG. 2, the power law slope, which is the slope of the ultra-small-angle X-ray scattering (U-SAXS) graph at a wavenumber ranging from 0.01/Å to 0.1/Å, is −3.4.

Hereinafter, the slope of the ultra-small-angle X-ray scattering (U-SAXS) graph at a wavenumber ranging from 0.01/Å to 0.1/Å is simply referred to as a "power law slope".

According to an embodiment of the present disclosure, ultra-small-angle X-ray scattering (U-SAXS) is performed under the following conditions using a 9A U-SAXS beamline of Pohang Accelerator Laboratory (Korea), and as a result, an ultra-small-angle X-ray scattering (U-SAXS) graph and the slope thereof are obtained.

Wavenumber range: 0.001 to 2.5/Å

Energy (E): 19.70 keV

Spacing distance between sample and detector: 6.5 m

Exposure time: 30 seconds

Specifically, according to an embodiment of the present disclosure, the sample of the light-transmitting film 100 may be measured using a radiation accelerator facility (Pohang light source) of the Pohang Accelerator Laboratory (Pohang, Korea). The Pohang light source of the Pohang Accelerator Laboratory (Pohang, Korea) includes a radiation light source and a detector, and a sample is placed in an optical path between the radiation light source and the detector. According to an embodiment of the present disclosure, the sample is measured in a transmission mode (T-SAXS). According to an embodiment of the present disclosure, for peak correction, a film consisting only of the light-transmitting matrix 110, without including the filler 120, is used as a reference. The measurement peak of the sample of the light-transmitting film 100 may be corrected based on the reference.

The size of the scattering angle 2θ may be determined by varying the spacing distance between the sample and the detector. According to an embodiment of the present disclosure, an ultra-small angle is achieved by disposing the sample such that the spacing distance between the sample and the detector is 6.5 m in the Pohang light source of the Pohang Accelerator Laboratory (Pohang, Korea).

With respect to optical properties, the light-transmitting film 100 according to an embodiment of the present disclosure may have a yellow index of 3 or less, a haze of 1% or less, and light transmittance of 85% or more.

In addition, the light-transmitting film 100 according to an embodiment of the present disclosure may have excellent mechanical properties, and may have a Young's modulus of 4.5 GPa or more and a 2% yield strength of 95 MPa or more.

According to an embodiment of the present disclosure, in order for the light-transmitting film 100 to have excellent optical and mechanical properties, the filler particle size, the content of the filler 120, and the spacing distance between the filler particles may be adjusted.

According to an embodiment of the present disclosure, the filler 120 may have an average particle diameter of 5 to 50 nm. When the average particle diameter of the filler 120 is less than 5 nm, the dispersibility of the filler 120 may be deteriorated and the particles of the filler 120 may aggregate. On the other hand, when the average particle diameter of the filler 120 is higher than 50 nm, the optical properties of the light-transmitting film 100 including the filler 120 may be deteriorated. For example, when a filler 120 having an average particle diameter of more than 50 nm is included in excess, the haze of the light-transmitting film 100 may be increased.

In addition, when the average particle diameter of the filler 120 is less than 5 nm, the mechanical strength of the light-transmitting film 100 is deteriorated in the portion n where the filler 120 aggregates due to the aggregation of the filler 120, and the Young's modulus and 2% yield strength of the light-transmitting film 100 may be deteriorated. When the average particle diameter of the filler 120 is higher than 50 nm, the yield strength of the light-transmitting film 100 may be less than 95 MPa, and mechanical strength may be deteriorated.

In addition, when the average particle diameter of the filler 120 is less than 5 nm, the dispersibility of the filler 120 may be deteriorated, and when the average particle diameter of the filler 120 is higher than 50 nm, sufficient spacing distance between particles of the filler 120 is not secured, and thus the power law slope may be less than −3.6 or greater than −3.2 in the wavenumber range of 0.01/Å to 0.1/Å of the ultra-small angle X-ray scattering (U-SAXS) graph.

According to another embodiment of the present disclosure, the filler 120 may have an average particle diameter of 10 to 20 nm, or may have an average particle diameter of 10 to 15 nm.

When the light-transmitting film 100 includes the filler 120 having a nanometer-scale particle size, the optical properties of the light-transmitting film 100 can be improved through light scattering by the filler 120. In addition, when the light-transmitting film 100 includes the filler 120, the mechanical properties of the light-transmitting film 100 can be improved.

According to an embodiment of the present disclosure, the filler 120 may be present in an amount of 5 to 50% by weight based on the total weight of the light-transmitting film 100. More specifically, in an embodiment in which the power law slope is within the range of −3.6 to −3.2, the content of the filler 120 may be in the range of 5 to 46% by weight based on the total weight of the light-transmitting film 100.

When the content of the filler 120 is less than 5% by weight based on the total weight of the light-transmitting film 100, the light-scattering effect based on the filler 120 is insufficient, and there is almost no improvement in the light transmittance of the light-transmitting film 100. In addition, when the content of the filler 120 is less than 5% by weight based on the total weight of the light-transmitting film 100, the effect of improving the Young's modulus and 2% yield strength of the light-transmitting film 100 may be insufficient.

On the other hand, when the content of the filler 120 is higher than 50% by weight based on the total weight of the light-transmitting film 100, the dispersibility of the filler 120 and the haze of the light-transmitting film 100 may be deteriorated and the excess filler 120 blocks light, and thus the light transmittance of the light-transmitting film 100 may be deteriorated. More specifically, when the content of the filler 120 is higher than 46% by weight based on the total weight of the light-transmitting film 100, the power law slope of the light-transmitting film 100 is out of the range of −3.6 to −3.2. Also, the haze of the light-transmitting film 100 and the light transmittance of the light-transmitting film 100 may be deteriorated.

According to an embodiment of the present disclosure, the average distance between adjacent particles of the filler 120 is 23 to 45 nm. More specifically, the average distance between the two adjacent particles of the filler 120 may be 23 to 45 nm.

When the average distance between adjacent particles of the filler 120 is less than 23 nm, the power law slope in a wavelength range of 0.01/Å to 0.1/Å in the ultra-small-angle X-ray scattering (U-SAXS) graph logarithmically showing the scattering intensity as a function of the wavenumber is less than −3.6 or is higher than −3.2, and the haze of the light-transmitting film 100 is deteriorated.

On the other hand, when the average distance between adjacent particles of the filler 120 is higher than nm, the light-scattering effect based on the filler 120 is insufficient and almost no improvement in the light transmittance of the light-transmitting film 100 is obtained.

Figure 3:
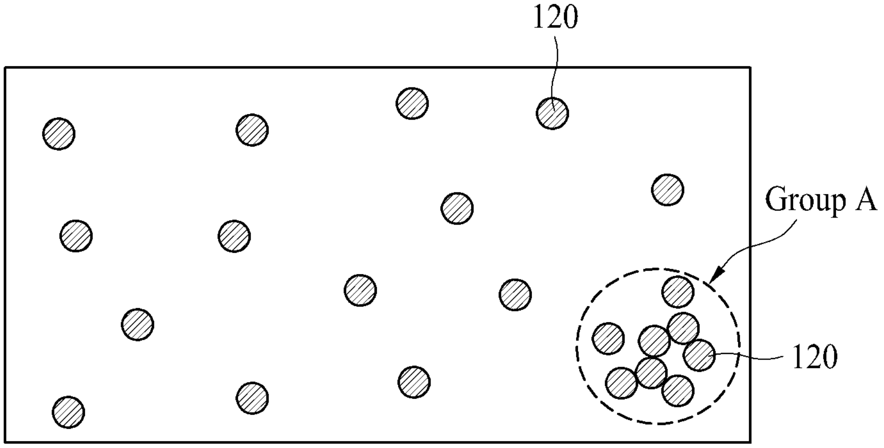
FIG. 3 is a schematic view illustrating a light-transmitting film according to another embodiment of the present disclosure.

FIG. 3 is a schematic diagram illustrating the state of the filler 120 dispersed in the light-transmitting film 100 according to an embodiment of the present disclosure.

According to an embodiment of the present disclosure, the particle size of the filler 120 and the distance between particles of the filler 120 are measured or calculated using a transmission electron microscope (TEM) image of the light-transmitting film 100.

Referring to FIG. 3, some of the particles of the filler 120 are spaced apart from one another and dispersed, whereas the remainder thereof form aggregates. In FIG. 3, "Group A" represents the particles of the filler 120 forming an aggregate. The shortest distance between particles of the filler 120 forming an aggregate, like "Group A" shown in FIG. 3, is less than 20 nm. On the other hand, unlike the particles of the filler 120 shown in "Group A", the shortest distance between filler particles that are not aggregated but dispersed (parts other than Group A) is 20 nm or more. As the number of particles of the filler 120 forming an aggregate, like "Group A" of FIG. 3 decreases, the uniformity of the filler 120 dispersed in the light-transmitting film 100 increases.

When the amount of the filler 120 forming an aggregate, like "Group A" of FIG. 3 is small, the power law slope, which is a slope at a wavenumber ranging from 0.01/Å to 0.1/Å in the ultra-small-angle X-ray scattering (U-SAXS) graph logarithmically showing the scattering intensity as a function of wavenumber, is within the range of −3.6 to −3.2, and thus the haze of the light-transmitting film 100 may be low.

In general, in the case where the filler 120 is included, when the filler 120 is not sufficiently uniformly dispersed, the optical properties of the light-transmitting film 120 may be deteriorated, for example, the optical transmittance of the light-transmitting film 120 may be deteriorated, and the haze of the light-transmitting film 120 may be more severe. However, according to an embodiment of the present disclosure, by adjusting the power law slope of the light-transmitting film 120 within the range of −3.6 to −3.2 in the wavenumber range of 0.01/Å to 0.1/Å of the ultra-small-angle X-ray scattering (U-SAXS) graph, an increase in the haze of the light-transmitting film 120 and a decrease in light transmittance thereof can be prevented.

According to an embodiment of the present disclosure, the power law slope of the light-transmitting film 100 is −3.6 to −3.2 in the wavenumber range of 0.01/Å to 0.1/Å of the ultra-small-angle X-ray scattering (U-SAXS) graph logarithmically representing scattering intensity as a function of wavenumber, and the light-transmitting film 100 has a light transmittance of 85% or more, 89% or more, 90% or more, or 91% or more, and may have a yellow index of 3.0 or less or 1.0 or less.

According to an embodiment of the present disclosure, by adjusting the power law slope of the light-transmitting film 100 within the range of −3.6 to −3.2, a yellow index of 3 or less can be imparted to the light-transmitting film 100.

In addition, according to an embodiment of the present disclosure, the light-transmitting film 100 may have a haze of 1% or less.

In addition, according to an embodiment of the present disclosure, the light-transmitting film 100 has a power law slope of −3.6 to −3.2 at a wavenumber ranging from 0.01/Å to 0.1/Å in the ultra-small angle X-ray scattering (U-SAXS) graph, and thus has a Young's modulus of 4.5 GPa or more and a 2% yield strength of 95 MPa or more.

According to another embodiment of the present disclosure, the filler 120 dispersed in the light-transmitting matrix 110 may have an average particle-scattering coefficient (XA) of 0.35 or less.

The average particle-scattering coefficient (XA) of the filler 120 is calculated in accordance with the following Equation 1:

$$XA = \sum_{k=1}^{38} X_k / 38 \quad \text{[Equation 1]}$$

In Equation 1, $X_k$ can be calculated in accordance with the following Equation 2:

$$X_k = \prod D / \lambda_k \quad \text{[Equation 2]}$$

In Equations 1 and 2, k is an integer from 1 to 38.

In addition, in Equation 2, $\lambda_k$ is $(37+k)\times 10$ nm and D is the particle size of the filler 120, measured using transmission electron microscopy (TEM).

According to another embodiment of the present disclosure, the particle diameter of the filler 120 corresponds to the particle size of the filler 120. In another embodiment of the present disclosure, D is the same as the average particle diameter of the filler 120 calculated using a transmission electron microscope (TEM). More specifically, the particle size "D" of Equation 2 corresponds to the average particle diameter of the filler 120 calculated from images obtained using a transmission electron microscope (TEM).

According to another embodiment of the present disclosure, the particle size D of the filler 120 applied to Equation 2 may be different from the actual particle size of the filler 120 used in the production of the light-transmitting film 100. For example, when two or more particles of the filler 120 aggregate or overlap each other along the observation direction of the transmission electron microscope (TEM) in the light-transmitting matrix 110, two or more particles of the filler 120 that aggregate or overlap may appear as one aggregated particle in the image obtained using a transmission electron microscope (TEM). As a result, the actual particle size of the filler 120 may be different from the average particle diameter D of the filler 120 calculated from an image obtained using a transmission electron microscope (TEM).

According to another embodiment of the present disclosure, in the process of calculating the average particle-scattering coefficient of the filler 120, the particle size of the filler 120 is calculated from an image obtained using a transmission electron microscope (TEM). For example, the particle size of the filler 120 may be obtained in accordance with the following method.

<Measuring Device>

Transmission electron microscope (TEM) (manufacturer: Jeol/model name: JEM-2100F)

<Measurement Conditions>

Acceleration voltage: 200 kV, magnification: 20,000 times (20K)

<Sectioning>

Microtome (Manufacturer: Leica/Model name: EM UC7)

Speed (mm/s): 1 mm/s

Feed (nm): 120 nm

Knife: DiATOME/Ultra 35 degrees

<Calculation Method>

Analysis was performed below using ImageJ as an image analysis program.

1) With regard to the type of image, conversion to 8 bits was performed.
2) Through "Find maxima" in Process, Noise was set to 100, Output type was set to "Maxima within tolerance", and conversion to "Exclude edge maxima" and "Light background" were performed.
3) "Fill holes" was performed in the Binary of Process.
4) "Watershed" was performed in the Binary of Process.
5) Dragging to a rectangle was performed to set the Area to 2250000~2500000 (except the part where a scale bar was present).
6) "Analyze particles" of "Analyze" was performed.

Size (pixel$^2$): 200-infinity, Circularity: 0.0~1.0

The area of each particle was summed, and the resulting sum was divided by the number of particles to obtain the "average particle area". The "average particle area" corresponds to an average of the number of pixels occupied by each filler in a transmission electron microscope (TEM) image.

7) In the image obtained using the transmission electron microscope (TEM), the scale bar is "Measured" with a straight segment to obtain "length per pixel (nm)". The length per pixel may be expressed in nm (nm/pixel). "Length per pixel (nm)" corresponds to the actual length of one side of a square pixel constituting a transmission electron microscope (TEM) image. Therefore, the actual area of one pixel is referred to as "[length per pixel (nm)]$^2$".

8) The average particle area (pixel) obtained in "6)" is converted to area in metric units or SI units using the length per pixel in "7)" to calculate the average particle size.

In the image obtained using the transmission electron microscope (TEM), the average of the number of pixels occupied by one filler is the "average particle area" and the actual area of one square pixel is (length per pixel)$^2$, so the area of the filler calculated from the image obtained using a transmission electron microscope (TEM) is "(average particle area)×(length per pixel)$^2$". According to another embodiment of the present disclosure, when the filler 120 is spherical, the two-dimensional area of the filler 120 may be "$\pi r^2 = \pi(\text{average particle diameter}/2)^2$".

Accordingly, the average particle diameter of the filler 120 may be obtained in accordance with the following Equation 3.

[Equation 3]

$$\text{Average particle diameter} = 2 \times \sqrt{\frac{\text{average particle area}}{\pi} \times (\text{length per pixel})^2}$$

For example, when the average particle area (pixel$^2$)=900 pixel$^2$ of all particles obtained in "6)" and the length per pixel obtained in "7)"=500/933 nm, the average particle diameter is as follows.

$$\text{Average particle diameter (nm)} = 2 * [(\text{average particle area} / \prod) * (\text{length per pixel})^2)]^{1/2} = 2 * [(900 / \prod) * (500/933)^2]^{1/2} = 18.14 \text{ nm}$$

The average particle diameter of the filler 120 calculated using a transmission electron microscope (TEM) and ImageJ may be used as the particle size D of the filler 120.

The average particle-scattering coefficient of the filler 120 is calculated in accordance with Equations 1 and 2 using the particle size D of the filler 120 thus obtained.

According to another embodiment of the present disclosure, when the filler 120 dispersed in the light-transmitting matrix 110 has an average particle-scattering coefficient (XA) of 0.35 or less, the filler 120 is uniformly dispersed and thus imparts excellent optical properties to the light-transmitting film 100. In addition, when the filler 120 is dispersed in the light-transmitting matrix 110 having an average particle-scattering coefficient (XA) of 0.35 or less, the effect of improving the mechanical properties of the light-transmitting film 100 can be maximized.

When the average particle-scattering coefficient (XA) of the filler 120 is higher than 0.35, the light transmittance of the light-transmitting film 100 may be deteriorated due to scattering in the visible wavelength region. As a result, there may be a problem in that the optical properties of the light-transmitting film 100 are deteriorated.

More specifically, according to another embodiment of the present disclosure, the filler 120 may have an average particle-scattering coefficient of 0.1 or more. When the average particle-scattering coefficient of the filler 120 is 0.1 or more, scattering may be small in the visible light region, and a reduction in light transmittance of the light-transmitting film 100 attributable to the filler 120 may be suppressed. In addition, when the average particle-scattering coefficient of the filler 120 is not less than 0.1 and not more than 0.35, and the refractive index of the filler 120 is small, there are advantages in that the refractive index of the filler 120 is reflected in the light-transmitting matrix 110, an effect of improving light transmittance may be obtained due to the decreased reflectance of the light-transmitting film 100, and the yellow index of the light-transmitting film 100 is reduced through the Rayleigh scattering effect.

According to another embodiment of the present disclosure, the filler 120 may have an average particle-scattering coefficient of 0.07 to 0.35.

According to another embodiment of the present disclosure, the filler 120 may have an average particle-scattering coefficient of 0.17 to 2.0.

According to another embodiment of the present disclosure, there is no particular limitation as to the size or content of the filler 120. According to another embodiment of the present disclosure, the size and content of the filler 120 may be adjusted in consideration of optical and mechanical properties of the light-transmitting film 100.

According to another embodiment of the present disclosure, the filler 120 may have an average particle diameter of 5 to 50 nm.

When the average particle diameter of the filler 120 is less than 5 nm, the number of particles is greatly increased for a given content thereof, and the dispersibility of the filler 120 is lowered due to an increase in the relative surface area, so the particles of the filler 120 may aggregate. On the other hand, when the average particle diameter of the filler 120 is higher than 50 nm, the optical properties of the light-transmitting film 100 including the filler 120 may be deteriorated. For example, when a filler 120 having an average particle diameter of more than 50 nm is included in excess, the light transmittance of the light-transmitting film 100 may be deteriorated and haze may be increased.

In addition, when the average particle diameter of the filler 120 is less than 5 nm, due to the aggregation of the filler 120, the mechanical strength of the light-transmitting film 100 may be deteriorated in the portion where the filler 120 aggregates. As a result, the modulus of the light-transmitting film 100 may be reduced and thus mechanical strength may be reduced.

According to another embodiment of the present disclosure, when the filler 120 is added, appropriate light scattering is caused by the filler 120, so the optical properties of the light-transmitting film 100 can be improved. The content of the filler 120 included in the light-transmitting film 100 may be adjusted in order to enhance the light-scattering effect.

According to another embodiment of the present disclosure, the content of the filler 120 may be within the range of 5 to 50% by weight based on the total weight of the light-transmitting film 100. More specifically, the content of the filler 120 may be adjusted to 5 to 40% by weight based on the total weight of the light-transmitting film 100.

When the content of the filler 120 is less than 5% by weight based on the total weight of the light-transmitting film 100, the light-scattering effect based on the filler 120 is insufficient, so almost no light transmittance improvement effect of the light-transmitting film 100 may be obtained and the effect of improving the modulus of the light-transmitting film 100 may be insufficient.

On the other hand, when the content of the filler 120 is higher than 50% by weight based on the total weight of the light-transmitting film 100, the dispersibility of the filler 120 may be deteriorated, the haze of the light-transmitting film 100 may be reduced, the filler 12 may aggregate due to an excess of the filler 120, the aggregated filler 120 may block light, and the light transmittance of the light-transmitting film 100 may be deteriorated.

According to another embodiment of the present disclosure, by adjusting the content and particle size of the filler 120 and improving the dispersion method, the average particle-scattering coefficient of the filler 120 dispersed in the light-transmitting matrix 110 is adjusted to 0.35 or less, and thus an increase in the haze of the light-transmitting film 120 and a decrease in light transmittance can be prevented.

According to another embodiment of the present disclosure, the light-transmitting film 100 may have a yellow index of 3 or less. More specifically, the light-transmitting film 100 according to another embodiment of the present disclosure may have a yellow index of 2.0 or less, or may have a yellow index of 1.0 or less.

According to another embodiment of the present disclosure, the light-transmitting film 100 may have a haze of 1% or less. More specifically, the light-transmitting film 100 according to another embodiment of the present disclosure may have a haze of 0.9% or less.

In addition, according to another embodiment of the present disclosure, the light-transmitting film 100 may have light transmittance of 88% or more. More specifically, the light-transmitting film 100 according to another embodiment of the present disclosure may have light transmittance of 89% or more, 90% or more, or 91% or more.

According to another embodiment of the present disclosure, by adjusting the average particle-scattering coefficient of the filler 120 dispersed in the light-transmitting matrix 110 to 0.35 or less, the light-transmitting film 100 can be imparted with a modulus of 5.0 GPa or more.

Figure 4:
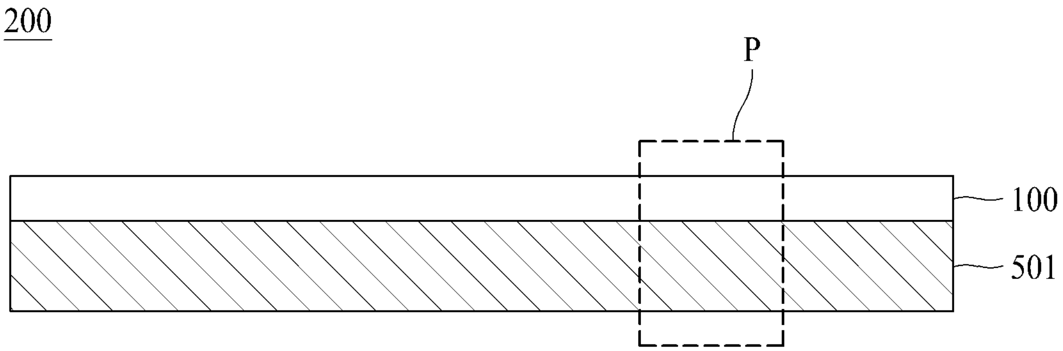
FIG. 4 is a cross-sectional view illustrating a part of a display device according to another embodiment of the present disclosure.
Figure 5:
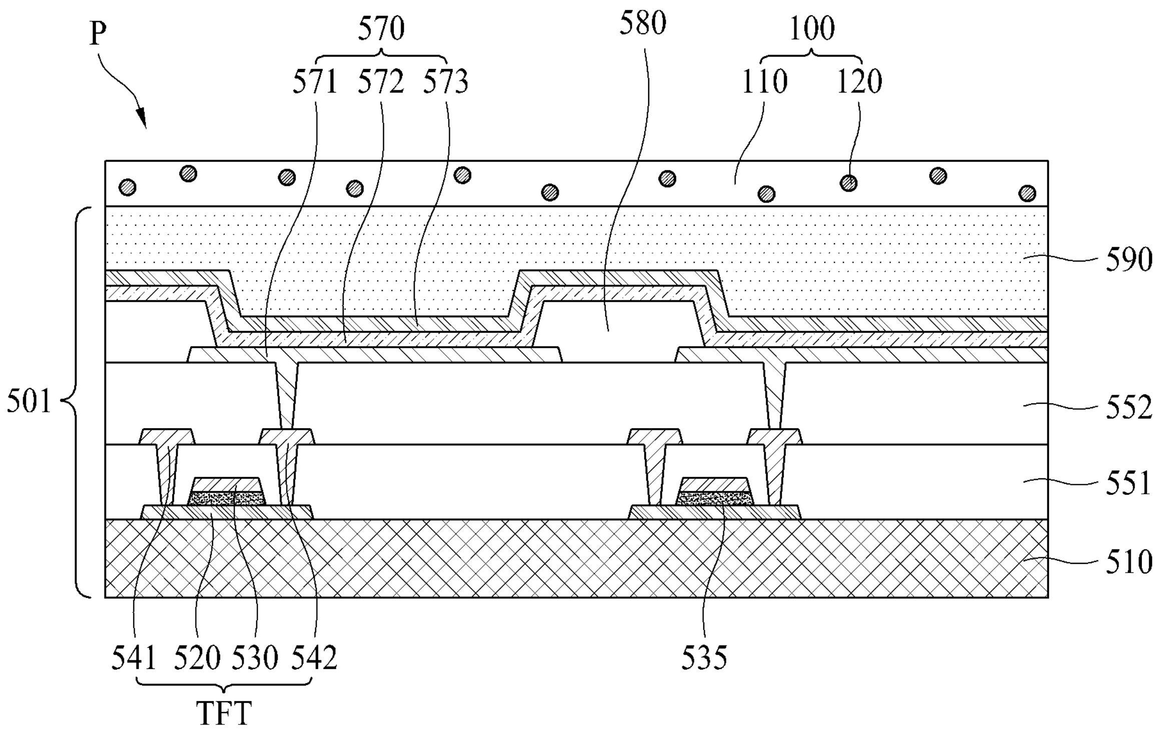
FIG. 5 is an enlarged cross-sectional view illustrating the part "P" of FIG. 4.

FIG. 4 is a cross-sectional view illustrating a part of a display device 200 according to another exemplary embodiment, and FIG. 5 is an enlarged cross-sectional view of part "P" in FIG. 4.

Referring to FIG. 4, the display device 200 according to another embodiment of the present disclosure includes a display panel 501 and a light-transmitting film 100 on the display panel 501.

Referring to FIGS. 4 and 5, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display device 200 shown in FIGS. 4 and 5 is an organic light-emitting display device.

The substrate 510 may be formed of glass or plastic. Specifically, the substrate 510 may be formed of plastic such as a polyimide-based resin or a polyimide-based film. Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and overlaps at least a part of the semiconductor layer 520, a source electrode 541 connected to the semiconductor layer 520, and a drain electrode 542 that is spaced apart from the source electrode 541 and is connected to the semiconductor layer 520.

Referring to FIG. 5, a gate insulating layer 535 is disposed between the gate electrode 530 and the semiconductor layer 520. An interlayer insulating layer 551 may be disposed on the gate electrode 530, and a source electrode 541 and a drain electrode 542 may be dis posed on the interlayer insulating layer 551.

A planarization layer 552 is disposed on the thin film transistor TFT to planarize the top of the thin film transistor TFT.

A first electrode 571 is disposed on the planarization layer 552. The first electrode 571 is connected to the thin film transistor TFT through a contact hole provided in the planarization layer 552.

A bank layer 580 is disposed on the planarization layer 552 in a part of the first electrode 571 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin film encapsulation layer 590 may be disposed on the second electrode 573. The thin film encapsulation layer 590 may include at least one organic layer and at least one inorganic layer, and the at least one organic layer and the at least one inorganic layer may be alternately disposed.

The light-transmitting film 100 is disposed on the display panel 501 having the stack structure described above. The light-transmitting film 100 includes a light-transmitting matrix 110 and a filler 120 dispersed in the light-transmitting matrix 110.

Hereinafter, the present disclosure will be described in more detail with reference to Preparation Examples and Examples. However, the Preparation Examples and Examples should not be construed as limiting the scope of the present disclosure.

Preparation Example 1: Preparation of Light-Transmitting Polymer Solid 776.655 g of N,N-dimethylacetamide (DMAc) was charged in a 1 L reactor equipped with a stirrer, a nitrogen injector, a dropping funnel, a temperature controller and a cooler, while nitrogen was passed through the reactor, the temperature of the reactor was adjusted to 25° C., 54.439 g (0.17 mol) of TFDB was dissolved therein, and the resulting solution was maintained at 25° C. 15.005 g (0.051 mol) of BPDA was added thereto, followed by stirring for 3 hours to thoroughly dissolve the BPDA, and then 22.657 g (0.051 mol) of 6FDA was added thereto and completely dissolved therein. The reactor temperature was dropped to 10° C., 13.805 g (0.068 mol) of TPC was added thereto, and the reaction was allowed to proceed at 25° C. for 12 hours to obtain a polymer solution having a solid concentration of 12% by weight.

17.75 g of pyridine and 22.92 g of acetic anhydride were added to the obtained polymer solution, followed by stirring for 30 minutes and then further stirring at 70° C. for 1 hour. The result was allowed to cool to room temperature, 20 L of methanol was added to the resulting polymer solution to precipitate a solid, and the precipitated solid was filtered, pulverized, washed again with 2 L of methanol, and then dried at 100° C. in a vacuum for 6 hours to obtain a powdery light-transmitting polymer solid. The light-transmitting polymer solid prepared herein is a polyimide-based resin solid. More specifically, the light-transmitting polymer solid prepared in Preparation Example 1 is a powder of the polyamide-imide polymer solid, and corresponds to a light-transmitting resin powder.

Example 1-1

31.88 g of N,N-dimethylacetamide (DMAC) (first solvent) was charged in a 1 L reactor, followed by stirring for a predetermined time, while the temperature of the reactor was maintained at 10° C. Then, 0.32 g (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

32.20 g of silica dispersion 1A (DMAC-ST, Nissan Chemical Industries) in which silica particles having an average particle diameter of 10 to 15 nm were dispersed in an amount of 20 wt % in DMAC (N,N-dimethylacetamide) solution (second solvent) was charged in another 1 L reactor, and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution. 377.96 g of DMAc was added as a third solvent to the first mixed solution, followed by stirring. Then, 64.08 g (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The second mixed solution thus obtained was cast. A casting substrate was used for casting. There is no particular limitation as to the type of the casting substrate. The casting substrate may be a glass substrate, a stainless (SUS) substrate, a Teflon substrate, or the like. According to an embodiment of the present disclosure, the casting substrate may be, for example, a glass substrate.

Specifically, the obtained second mixed solution was applied to a glass substrate, cast, and dried with hot air at 130° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 80 μm and including a light-transmitting matrix 110 and a silica-based filler 120 dispersed in the light-transmitting matrix 110 was completed. Here, the light-transmitting matrix 110 was formed of a polyimide-based resin, and had a film shape.

Example 1-2

70.51 g of DMAc (first solvent) was charged in a 1 L reactor, followed by stirring for a predetermined time, while the temperature of the reactor was maintained at 10° C. Then, 0.71 g (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

118.7 g of silica dispersion 1A (DMAC-ST, Nissan Chemical Industries) was charged in another 1 L reactor and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution.

144.29 g of DMAc was added as a third solvent to the first mixed solution, followed by stirring. Then, 74.34 g (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 130° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 80 μm and including a light-transmitting matrix 110 and a silica-based filler 120 dispersed in the light-transmitting matrix 110 was completed.

Example 1-3

78.53 g of DMAc (first solvent) was charged in a 1 L reactor, followed by stirring for a predetermined time, while the temperature of the reactor was maintained at 10° C. Then, 0.79 g (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

39.66 g of silica dispersion 1B (MEK-ST-40, Nissan Chemical Industries), in which silica particles having an average particle diameter of 10 to 15 nm are dispersed in a n amount of 40 wt % in a methyl ethyl ketone (MEK) solution (second solvent), was charged in another 1 L reactor, and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution.

244.79 g of DMAc was added as a third solvent to the first mixed solution, followed by stirring. Then, 52.09 g (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 130° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting light-transmitting film was further heat-treated at 250° C. for 5 minutes.

As a result, production of a light-transmitting film 100 having a thickness of 80 μm and including a light-transmitting matrix 110 and a silica-based filler 120 dispersed in the light-transmitting matrix 110 was completed.

Example 1-4

36.81 g of DMAc (first solvent) was charged in a 1 L reactor, followed by stirring for a predetermined time while the temperature of the reactor was maintained at 10° C. Then, 0.37 g (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

92.95 g of silica dispersion 1B (MEK-ST-40, Nissan Chemical Industries) was charged in another 1 L reactor, and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution. 295.46 g of DMAc was added as a third solvent to the first mixed solution, followed by stirring. Then, 61.60 g (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 130° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 80 μm and including a light-transmitting matrix 110 and a silica-based filler 120 dispersed in the light-transmitting matrix 110 was completed.

Comparative Example 1-1

A light-transmitting film according to Comparative Example 1-1 was produced using a solution-powder mixing method.

Specifically, 219.48 g of DMAc and 163.82 g of silica dispersion 1C (PGM-ST, Nissan Chemical Industries), in which silica particles having an average particle diameter of 10 to 15 nm were dispersed in an amount of 30% by weight in a propylene glycol monomethyl ether (PGME) solution, as a silica dispersion were charged in a 1 L reactor, followed by stirring for a certain period of time while the temperature of the reactor was maintained at 10° C. Then, 55.85 g of polyamide-imide as a solid powder prepared in Preparation Example 1 was added thereto, followed by stirring for 1 hour and then elevating the temperature to 25° C. to obtain a light-transmitting resin solution in which silica particles were dispersed.

The obtained second mixed solution was applied to a glass substrate, cast, and dried with hot air at 130° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes to produce a light-transmitting film having a thickness of 80 μm.

Comparative Example 1-2

A light-transmitting film having a thickness of 80 μm was produced by repeating the same process as in Comparative Example 1-1, except that 361.71 g of DMAc and 50.58 g of a polyamide-imide solid powder were used, and 25.29 g of silica dispersion 1D (MEK-ST-L, Nissan Chemical Industries), in which silica particles having an average particle diameter of 45 nm were dispersed in 30 wt % in a methyl ethyl ketone (MEK) solution, was used as a silica dispersion.

<Measurement Example>

The following measurements were performed on the light-transmitting films produced in Examples 1-1 to 1-4 and Comparative Examples 1-1 and 1-2.

(1) Ultra-small-angle X-ray scattering (U-SAXS) graph and power law slope

Ultra-small-angle X-ray scattering (U-SAXS) was performed under the following conditions using the 9A U-SAXS beamline of Pohang Accelerator Laboratory (Korea) as an ultra-small-angle X-ray scattering (U-SAXS) measurement device to obtain an ultra-small-angle X-ray scattering (U-SAXS) graph. A slope was calculated at a wavenumber ranging from 0.01/Å to 0.1/Å from the obtained ultra-small-angle X-ray scattering (U-SAXS) graph to obtain a power law slope.

Wavenumber range: 0.001 to 2.5/Å

Energy (E): 19.70 keV

Spacing distance between sample and detector: 6.5 m

Exposure time: 30 seconds (2) Light transmittance (%): the average light transmittance at a wavelength of 360 to 740 nm was measured using a spectrophotometer (CM-3700D, KONICA MINOLTA) in accordance with the ASTM E313 standard.

(3) Yellow index: the yellow index was measured using a spectrophotometer (CM-3700D, KONICA MINOLTA) in accordance with the ASTM E313 standard.

(4) Haze: the produced light-transmitting film was cut into 50 mm×50 mm pieces and measured 5 times in accordance with the ASTM D1003 standard using a haze meter produced by Murakami Color Research Laboratory (model name: HM-150), and the average thereof was set as the haze.

(5) Inter-particle distance: the distance between particles of the filler 120 was measured using a transmission electron microscope (TEM) image of the light-transmitting film.

(6) Young's modulus and 2% yield strength: the Young's modulus and 2% yield strength of the light-transmitting film were measured in accordance with the ASTM D885 standard using a universal tensile tester produced by Instron.

The measurement results are shown in Table 1 below.

TABLE 1

| Item | Power law slope | Light trans- mittance (%) | Yellow index | Haze | Inter-particle distance (nm, average) | Young's modulus (GPa) | 2% yield strength (MPa) |
|---|---|---|---|---|---|---|---|
| Example 1-1 | −3.34 | 88.72 | 2.91 | 0.5 | 44.0 | 4.8 | 128 |
| Example 1-2 | −3.35 | 89.53 | 2.80 | 0.3 | 23.7 | 5.5 | 108 |
| Example 1-3 | −3.40 | 89.61 | 2.83 | 0.3 | 29.8 | 5.0 | 130 |
| Example 1-4 | −3.41 | 89.93 | 2.75 | 0.4 | 28.1 | 5.3 | 110 |
| Comparative Example 1-1 | −3.08 | 85.12 | 3.70 | 1.1 | Unmeasurable | 4.4 | 93 |
| Comparative Example 1-2 | −3.81 | 86.52 | 5.74 | 1.9 | Unmeasurable | 4.0 | 91 |

As can be seen from the result of measurement shown in Table 1, the light-transmitting film 100 according to the embodiments of the present disclosure has a power law slope of −3.6 to −3.2 at a wavenumber ranging from 0.01/Å to 0.1/Å in an ultra-small-angle X-ray scattering (U-SAXS) graph logarithmically showing the scattering intensity versus the wavenumber. The light-transmitting film 100 having such a power law slope according to embodiments of the present disclosure has excellent light transmittance, low yellow index, and low haze. In addition, it can be seen that in the light-transmitting film 100 according to embodiments of the present disclosure, the particles of the filler 120 are spaced apart from one another by an average distance of 20 nm or more.

Example 2-1

56.28 parts by weight of DMAc (first solvent) was charged in a 1 L reactor, followed by stirring for a predetermined time, while the temperature of the reactor was maintained at 10° C. Then, 0.569 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

37.9 parts by weight of silica dispersion 2A (SSD_330T, Ranco) in which silica particles having an average particle diameter of 10 to 15 nm were dispersed in an amount of 30 wt % in a DMAC (N,N-dimethylacetamide) solution (second solvent) was charged in another 1 L reactor, and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution.

338.40 parts by weight of DMAc was added as a third solvent to the first mixed solution, followed by stirring. Then, 63.832 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was cast. A casting substrate was used for casting. There is no particular limitation as to the type of the casting substrate. The casting substrate may be a glass substrate, a stainless (SUS) substrate, a Teflon substrate, or the like. According to an embodiment of the present disclosure, the casting substrate may be, for example, a glass substrate.

Specifically, the obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Example 2-2

212.50 parts by weight of DMAc (first solvent) was charged in a 1 L reactor, followed by stirring for a predetermined time, while the temperature of the reactor was maintained at 10° C. Then, 2.147 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

143.1 parts by weight of silica dispersion 2A (SSD_330T, Ranco) in which silica particles having an average particle diameter of 10 to 15 nm were dispersed in an amount of 30 wt % in a DMAC (N,N-dimethylacetamide) solution (second solvent) was charged in another 1 L reactor, and the prepared liquid light-transmitting resin solution was slowly injected using a cylindrical pump for 1 hour while the temperature of the reactor was maintained at 25° C. to prepare a first mixed solution in which the silica dispersion was mixed with the light-transmitting resin solution.

264.76 parts by weight of DMAc was added as a third solvent to the first mixed solution, followed by stirring. Then, 62.254 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Example 2-3

56.28 parts by weight of DMAc (first solvent) was charged in a 1 L reactor, followed by stirring for a predetermined time while the temperature of the reactor was maintained at 10° C. Then, 0.569 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

37.9 parts by weight of silica dispersion 2B (SSK230U2, Ranco) in which silica particles having an average particle diameter of 30 nm were dispersed in an amount of 30 wt % in a DMAC (N,N-dimethylacetamide) solution (second solvent) was charged in another 1 L reactor, and the prepared liquid light-transmitting resin solution was slowly injected using a cylindrical pump for 1 hour, while maintaining the temperature of the reactor at 25° C., to prepare a first mixed solution in which the silica dispersion was mixed with the light-transmitting resin solution.

338.40 parts by weight of DMAc was added as a third solvent to the first mixed solution, followed by stirring. Then, 63.832 parts by weight (second amount) of polyamide-imide as a solid powder (light-transmitting resin powder) prepared in Preparation Example was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Example 2-4

136.62 parts by weight of DMAc (first solvent) was charged in a 1 L reactor, followed by stirring for a predetermined time, while the temperature of the reactor was maintained at 10° C. Then, 1.38 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

92 parts by weight of silica dispersion 2B (SSK230U2, Ranco) was charged in another 1 L reactor, and the prepared liquid light-transmitting resin solution was slowly injected using a cylindrical pump for 1 hour, while maintaining the temperature of the reactor at 25° C. to prepare a first mixed solution in which the silica dispersion was mixed with the light-transmitting resin solution.

300.53 parts by weight of DMAc was added as a third solvent to the first mixed solution, followed by stirring. Then, 63.02 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Example 2-5

16.83 parts by weight of DMAc (first solvent) was charged in a 1 L reactor, followed by stirring for a predetermined time, while the temperature of the reactor was maintained at 10° C. Then, 0.17 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

17 parts by weight of silica dispersion 2C (50 nmSP-AD1, Admatechs) in which silica particles having an average particle diameter of 50 nm were dispersed in an amount of 20 wt % in a DMAC (N,N-dimethylacetamide) solution (second solvent) was charged in another 1 L reactor, and the prepared liquid light-transmitting resin solution was slowly injected using a cylindrical pump for 1 hour, while maintaining the temperature of the reactor at 25° C., to prepare a first mixed solution in which the silica dispersion was mixed with the light-transmitting resin solution.

351.33 parts by weight of DMAc was added as a third solvent to the first mixed solution, followed by stirring. Then, 64.23 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Comparative Example 2-1

398.66 parts by weight of DMAc (first solvent) was charged in a 1 L reactor, followed by stirring for a predetermined time while the temperature of the reactor was maintained at 10° C. Then, 3.936 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

262.4 parts by weight of silica dispersion 2A (SSD_330T, Ranco) in which silica particles having an average particle diameter of 10 to 15 nm are dispersed in a n amount of 30 wt % in a DMAC (N,N-dimethylacetamide) solution (second solvent) was charged in another 1 L reactor, and the prepared liquid light-transmitting resin solution was slowly injected using a cylindrical pump for 1 hour, while maintaining the temperature of the reactor at 25° C., to prepare a first mixed solution in which the silica dispersion was mixed with the light-transmitting resin solution.

181.25 parts by weight of DMAc was added as a third solvent to the first mixed solution, followed by stirring. Then, 60.464 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Comparative Example 2-2

368.16 parts by weight of DMAc (first solvent) was charged in a 1 L reactor, followed by stirring for a predetermined time, while the temperature of the reactor was maintained at 10° C. 64.4 parts by weight of silica dispersion 2C (50nmSP-AD1, Admatechs) in which silica particles having an average particle diameter of 50 nm were dispersed in an amount of 20 wt % in a DMAc (N,N-dimethylacetamide) solution (second solvent) was charged in another 1 L reactor, and the prepared liquid light-transmitting resin solution was slowly injected using a cylindrical pump for 1 hour, while maintaining the temperature of the reactor at 25° C., to prepare a light-transmitting resin mixed solution as a liquid.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Comparative Example 2-3

319.49 parts by weight of DMAc (first solvent) was charged in a 1 L reactor, followed by stirring for a predetermined time, while the temperature of the reactor was maintained at 10° C. Then, 0.568 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

56.8 parts by weight of silica dispersion 2D (DMAC-ST-ZL, Nissan) in which silica particles having an average particle diameter of 70 nm were dispersed in an amount of 20 wt % in a DMAC (N,N-dimethylacetamide) solution (second solvent) was charged in another 1 L reactor, and the prepared liquid light-transmitting resin solution was slowly injected using a cylindrical pump for 1 hour, while maintaining the temperature of the reactor at 25° C., to prepare a first mixed solution in which the silica dispersion was mixed with the light-transmitting resin solution.

319.49 parts by weight of DMAc was added as a third solvent to the first mixed solution, followed by stirring. Then, 63.832 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

Comparative Example 2-4

56.23 parts by weight of DMAc (first solvent) was charged in a 1 L reactor, followed by stirring for a predetermined time, while the temperature of the reactor was maintained at 10° C. Then, 0.568 parts by weight (first amount) of polyamide-imide as a solid powder (light-transmitting resin powder) prepared in Preparation Example 1 was added thereto, followed by stirring for one hour and then elevating the temperature to 25° C. to prepare a light-transmitting resin solution as a liquid.

56.8 parts by weight of silica dispersion 2E (Y100SP-CD1, Admatechs) in which silica particles having an average particle diameter of 100 nm were dispersed in an amount of 20 wt % in a DMAC (N,N-dimethylacetamide) solution (second solvent) was charged in another 1 L reactor and the prepared liquid light-transmitting resin solution was slowly injected using a cylindrical pump for 1 hour, while maintaining the temperature of the reactor at 25° C., to prepare a first mixed solution in which the silica dispersion was mixed with the light-transmitting resin solution.

319.49 parts by weight of DMAc was added as a third solvent to the first mixed solution, followed by stirring. Then, 63.832 parts by weight (second amount) of polyamide-imide as a solid powder (light-transmitting resin powder) prepared in Preparation Example 1 was added thereto, followed by stirring, to prepare a second mixed solution. The second mixed solution was a light-transmitting resin solution in which silica particles were dispersed.

The obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and separated from the frame to obtain a light-transmitting film. The light-transmitting film was further heat-treated at 250° C. for 5 minutes.

As a result, production of a light-transmitting film 100 having a thickness of 50 μm and including a light-transmitting matrix 110 and a silica-based filler 120 dispersed in the light-transmitting matrix 110 was completed.

<Measurement Example>

The following measurements were performed on the light-transmitting films produced in Examples 2-1 to 2-5 and Comparative Examples 2-1 to 2-4.

Average particle-scattering coefficient

<Measuring Device>

Transmission electron microscope (TEM) (manufacturer: Jeol/model name: JEM-2100F)

<Measurement Conditions>

Acceleration voltage: 200 kV, magnification: 20,000 times (20K)

<Sectioning>

Microtome (Manufacturer: Leica/Model name: EM UC7)

Speed (mm/s): 1 mm/s

Feed (nm): 120 nm

Knife: DiATOME/Ultra 35 degrees

<Calculation Method>

Analysis was performed below using ImageJ as an image analysis program.

1) With regard to the type of image, conversion to 8 bits was performed.
2) Through "Find maxima" in Process, Noise was set to 100, Output type was set to "Maxima within tolerance", and conversion to "Exclude edge maxima" and "Light background" was performed.
3) "Fill holes" was performed in the Binary of Process.
4) "Watershed" was performed in the Binary of Process.
5) Dragging of a rectangle was performed to set the Area to 2250000~2500000 (except the part where a scale bar is present).
6) "Analyze particles" of "Analyze" was performed. Size ($pixel^2$): 200-infinity, Circularity: 0.0~1.0

The area of each particle is summed, and the resulting sum is divided by the number of particles to obtain the "average particle area".

7) In the image obtained using a transmission electron microscope (TEM), the scale bar is measured with a straight segment to obtain "length per pixel (nm)".
8) The average particle area (pixel) obtained in "6)" is converted to area in metric or SI units using the length per pixel in "7)" to calculate the average particle size.

[Equation 3]

$$\text{Average particle diameter} = 2\times\sqrt{\frac{\text{average particle area}}{\pi}\times(\text{length per pixel})^2}$$

The average particle diameter of the filler 120, calculated using a transmission electron microscope (TEM) and ImageJ, was used as the particle size D of Equation 2.

The average particle-scattering coefficient (XA) of the filler 120 is calculated in accordance with the following Equations 1 and 2 using the obtained particle size D of the filler 120.

$$XA=\sum_{k=1}^{38} X_k/38 \quad \text{[Equation 1]}$$

$\lambda_k$ in Equation 1 can be calculated in accordance with the following Equation 2:

$$X_k=\prod D/\lambda_k \quad \text{[Equation 2]}$$

In Equations 1 and 2, k is an integer from 1 to 38.

In addition, in Equation 2, $\lambda_k$ is (37+k)×10 nm and D is a particle size of the filler 120 measured using transmission electron microscopy (TEM).

(2) Light transmittance (%): the average light transmittance at a wavelength of 360 to 740 nm was measured using a spectrophotometer (CM-3700D, KONICA MINOLTA) in accordance with the ASTM E313 standard.

(3) Yellow index: the yellow index was measured using a spectrophotometer (CM-3700D, KONICA MINOLTA) in accordance with the ASTM E313 standard.

(4) Haze: the produced light-transmitting film was cut into 50 mm×50 mm pieces and measured 5 times in accordance with the ASTM D1003 standard using a haze meter produced by Murakami Color Research Laboratory (model name: HM-150), and the average thereof was set as the haze.

(5) Modulus: the modulus of the light-transmitting film was measured in accordance with the ASTM D885 standard using a universal tensile tester produced by Instron.

Measurement standards within 3 hours after film production

Road Cell 30KN, Grip 250N.

Specimen size: 10×50 mm, tensile speed: 25 mm/min

The measurement results are shown in Table 2 below.

TABLE 2

| Item | Average particle-scattering coefficient | Light transmittance (%) | Yellow index | Haze | Modulus |
|---|---|---|---|---|---|
| Example 2-1 | 0.075 | 89.8 | 2.6 | 0.2 | 5.3 |
| Example 2-2 | 0.08 | 90.4 | 2.3 | 0.2 | 5.7 |
| Example 2-3 | 0.21 | 89.7 | 2.6 | 0.3 | 5.3 |
| Example 2-4 | 0.212 | 90.1 | 2.5 | 0.3 | 5.5 |
| Example 2-5 | 0.34 | 89.6 | 2.5 | 0.3 | 5.4 |
| Comparative Example 2-1 | 0.51 | 88.8 | 3.1 | 0.6 | 4.9 |
| Comparative Example 2-2 | 0.55 | 88.5 | 3.2 | 0.8 | 4.9 |
| Comparative Example 2-3 | 0.48 | 88.3 | 3.5 | 1.2 | 4.9 |
| Comparative Example 2-4 | 0.64 | 88.2 | 3.9 | 1.8 | 4.7 |

As can be seen from the results of measurement shown in Table 2, the light-transmitting film 100 according to the embodiments of the present disclosure has an average particle-scattering coefficient of 0.35 or less and thus exhibits excellent light transmittance, low yellow index, and low haze.

EXPLANATION OF REFERENCE NUMERALS

100: Light-transmitting film
110: Light-transmitting matrix
120: Filler
200: Display device
501: Display panel

The invention claimed is:

1. A light-transmitting film comprising:
a light-transmitting matrix; and
a filler dispersed in the light-transmitting matrix,
wherein the filler comprises silica ($SiO_2$),
wherein at least a part of the silica ($SiO_2$) is surface-treated with at least one of methylalkoxysilane, ethylalkoxysilane, or phenylalkoxysilane,
wherein, in an ultra-small-angle X-ray scattering (U-SAXS) graph logarithmically showing a scattering intensity as a function of a wavenumber, the light-transmitting film has a power law slope, which is the slope of the graph in a wavenumber range of 0.01/Å to 0.1/Å, of −3.6 to −3.2.

2. The light-transmitting film according to claim 1, wherein the filler has an average particle diameter of 5 to 50 nm.

3. The light-transmitting film according to claim 1, wherein the filler is present in an amount of 5 to 46% by weight based on a total weight of the light-transmitting film.

4. The light-transmitting film according to claim 1, wherein an average shortest distance between adjacent filler particles is between 23 and 45 nm.

5. The light-transmitting film according to claim 1, wherein the light-transmitting film has a yellow index of 3 or less.

6. The light-transmitting film according to claim 1, wherein the light-transmitting film has a haze of 1% or less.

7. The light-transmitting film according to claim 1, wherein the light-transmitting film has a light transmittance of 85% or more.

8. The light-transmitting film according to claim 1, wherein the light-transmitting film has a Young's modulus of 4.5 GPa or more and a 2% yield strength of 95 MPa or more.

9. The light-transmitting film according to claim 1, wherein the light-transmitting matrix comprises an imide repeating unit.

10. The light-transmitting film according to claim 1, wherein the light-transmitting matrix comprises an amide repeating unit.

* * * * *